US010867351B1

(12) United States Patent
Vadaparty et al.

(10) Patent No.: US 10,867,351 B1
(45) Date of Patent: Dec. 15, 2020

(54) METADATA-DRIVEN RULES PROCESSING ENGINE FOR ORDER MANAGEMENT SYSTEM

(71) Applicant: Morgan Stanley Services Group Inc., New York, NY (US)

(72) Inventors: Kumar Vadaparty, Belle Mead, NJ (US); Vishal Agrawal, Montville, NJ (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 16/876,397

(22) Filed: May 18, 2020

Related U.S. Application Data

(60) Provisional application No. 62/865,456, filed on Jun. 24, 2019.

(51) Int. Cl.
*G06Q 40/04* (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS

| | | | |
|---|---|---|---|
| 7,313,267 B2 | 12/2007 | Call et al. | |
| 7,640,208 B2 * | 12/2009 | Grossman | G06Q 10/10 705/37 |
| 7,877,727 B2 | 1/2011 | Sharp et al. | |
| 9,405,758 B2 | 8/2016 | Ruan et al. | |
| 9,658,901 B2 | 5/2017 | Addala et al. | |
| 9,672,560 B2 | 6/2017 | Malapati et al. | |
| 2005/0002159 A1 | 1/2005 | Bemardin et al. | |
| 2005/0021594 A1 | 1/2005 | Bernardin et al. | |
| 2007/0245040 A1 | 10/2007 | Acsadi | |
| 2008/0177872 A1 | 7/2008 | Vengroff | |
| 2008/0301079 A1 | 12/2008 | Proctor et al. | |
| 2009/0089202 A1 | 4/2009 | Rowley | |
| 2010/0228672 A1 * | 9/2010 | Karim | G06Q 20/10 705/44 |
| 2015/0073976 A1 | 3/2015 | Martignoni | |
| 2018/0089601 A1 | 3/2018 | Link et al. | |
| 2019/0066214 A1 | 2/2019 | Teixeira et al. | |

\* cited by examiner

*Primary Examiner* — Joseph W. King
*Assistant Examiner* — Amit Patel
(74) *Attorney, Agent, or Firm* — K&L Gates LLP

(57) ABSTRACT

An efficient, light weight framework executes business rules for an asset class-agnostic order management system. The business rules are specified in metadata configuration files separated from the rules execution engine. The metadata utilized by the rules engine also includes entity model and instructions for stateless orchestration to be performed during the process of rules execution. This metadata is automatically generated from human readable artifacts that capture business rules, entity model and orchestration steps in an easy to understand format.

16 Claims, 5 Drawing Sheets

Fig. 3

Rules Data Model

| Entity | Field Name | Type | Field Type | DataService (empty if no data service) | Valid Values/Unit/DomainT | Description |
|---|---|---|---|---|---|---|
| account | account | string | | | | |
| account | acct-class | string | | AccountDS | | |
| position | | list-of-string | | | | |
| position | | Boolean | | | | |
| security | | map | | | | |
| security | | | | | | |
| transaction | | | | | | |
| transaction | | | | | | |

Fig. 4

| Rule No. | Rule ID | Product | | | | | Rule Name | Precise Rule Expression | Rule Description |
|---|---|---|---|---|---|---|---|---|---|
| | | A | B | C | D | | | | |
| 1 | | Y | Y | Y | | | | | |
| 2 | | Y | Y | | | | | | |
| 3 | | Y | Y | Y | Y | | | | |
| 4 | | | Y | Y | Y | | | | |
| 5 | | | Y | Y | Y | | | | |

| | A | B | C | D |
|---|---|---|---|---|
| 1 | Rule ID | Rule Name | Outcome | Rule Message |
| 2 | | | Failure | |
| 3 | | | Warning | |
| 4 | | | Manager approval | |
| 5 | | | | |
| 6 | | | | |
| 7 | | | | |

METADATA-DRIVEN RULES PROCESSING ENGINE FOR ORDER MANAGEMENT SYSTEM

PRIORITY CLAIM

The present application claims priority to U.S. provisional patent application Ser. No. 62/865,456, filed Jun. 24, 2019, having the same title and inventors as indicated above, and which is incorporated herein by reference in its entirety.

CROSS-REFERENCE TO RELATED APPLICATIONS

The subject matter and content of the present application are related to the following applications:
- Ser. No. 16/272,362, entitled "Meta Data Driven State Transition Engine for Order Management System," filed Feb. 11, 2019;
- Ser. No. 16/688,468, entitled "Meta Data Driven State Transition Engine for Order Management System," filed Nov. 19, 2019;
- Ser. No. 16/531,241, entitled "Metadata Driven Orchestration Engine," filed Aug. 5, 2019; and
- Ser. No. 16/690,596, entitled "Metadata Driven Orchestration Engine," filed Nov. 21, 2019.

The above-listed applications, all of which are assigned to the Applicant of the present application, are incorporated herein by reference in their entirety.

BACKGROUND

An order management system is a computer system that executes trade orders for financial securities. Brokers and dealers use order management systems when filling orders for various types of securities, such as orders to buy or sell stocks, bonds or other financial securities, and to track the progress of each trade order through its various states of progression, such as pre-approval (if needed), opened, filled, canceled, confirmed, etc. Order management systems are often (although not always) implemented with so-called "middle tier" computer systems that orchestrate various activities (such as business logic execution and data retrieval services) and that execute the state transitions. The middle tier often relies on business rules in orchestrating the activities and executing the state transitions, which business rules can vary based on, for example, the product (e.g., type of financial security) and the computer platforms that handle the trade orders for the various products. As such, the execution of business rules is typically performed in various code modules that are spread across multiple programs. These code modules are expensive to maintain and update on a regular basis to meet the evolving needs of the business (e.g., the broker/dealers). This multiple-program approach also leads to vertical product-specific implementations that increase the total cost of ownership.

While many of the business rules across multiple products may be common, the business rule programs for the product typically do not share the code base, creating replicas of product specific implementations. Any changes to these business rules that apply across multiple products need to be performed across all such copies of the code, which increases both development and testing efforts. Embedding the business rules in code also results in reduced transparency when assessing business and rules compliance. Documentation maintained separately for separate systems is likely to diverge over time, thereby requiring compliance personnel to rely on development teams to provide the latest interpretation of the business rules logic.

SUMMARY

In one general aspect, the present invention is directed to an efficient, light weight framework for executing business rules for an asset class-agnostic order management system. The business rules are specified in metadata configuration files separated from the rules execution engine. The metadata utilized by the rules engine also includes entity model and instructions for stateless orchestration to be performed during the process of rules execution. This metadata is automatically generated from human readable artifacts that capture business rules, entity model and orchestration steps in an easy to understand format.

Embodiments of the present invention can provide many benefits over prior art systems. For example, with embodiments the present invention, business rules can be specified for an asset class-agnostic order management system. Also, the present invention can provide the ability to specify entity model and orchestration steps required to execute business rules for an asset class-agnostic order management system. Still further, the present invention can provide the ability to specify business rules, entity model, and/or orchestration steps in metadata configuration files that are separate from the business rules execution engine itself, where the metadata files would be leveraged by a business rules engine during rules execution. Additionally, the present invention can provide the ability to specify business rules, entity model and/or orchestration steps in a human readable format that is easy to understand and maintain. Further, the present invention can provide the ability to automatically generate the metadata from human the readable documents. Also, the present invention can provide the ability to automatically execute test cases to verify the business rules. The business rule can be for a single order or across multiple orders, and the rules for both single and multiple orders can be specified in the same human-readable artifact. These and other benefits realizable through embodiments of the present invention will be apparent from the following description.

FIGURES

Various embodiments of the present invention are described herein by way of example in conjunction with the following figures, wherein:

FIG. 3 shows a sample rules data model sheet of the artifacts file of FIG. 2 according to various embodiments of the present invention;

FIG. 4 shows a sample rules sheet of the artifacts file of FIG. 2 according to various embodiments of the present invention;

FIG. 5 shows a sample rule outcomes sheet of the artifacts file of FIG. 2 according to various embodiments of the present invention.

DESCRIPTION

Figure 1:
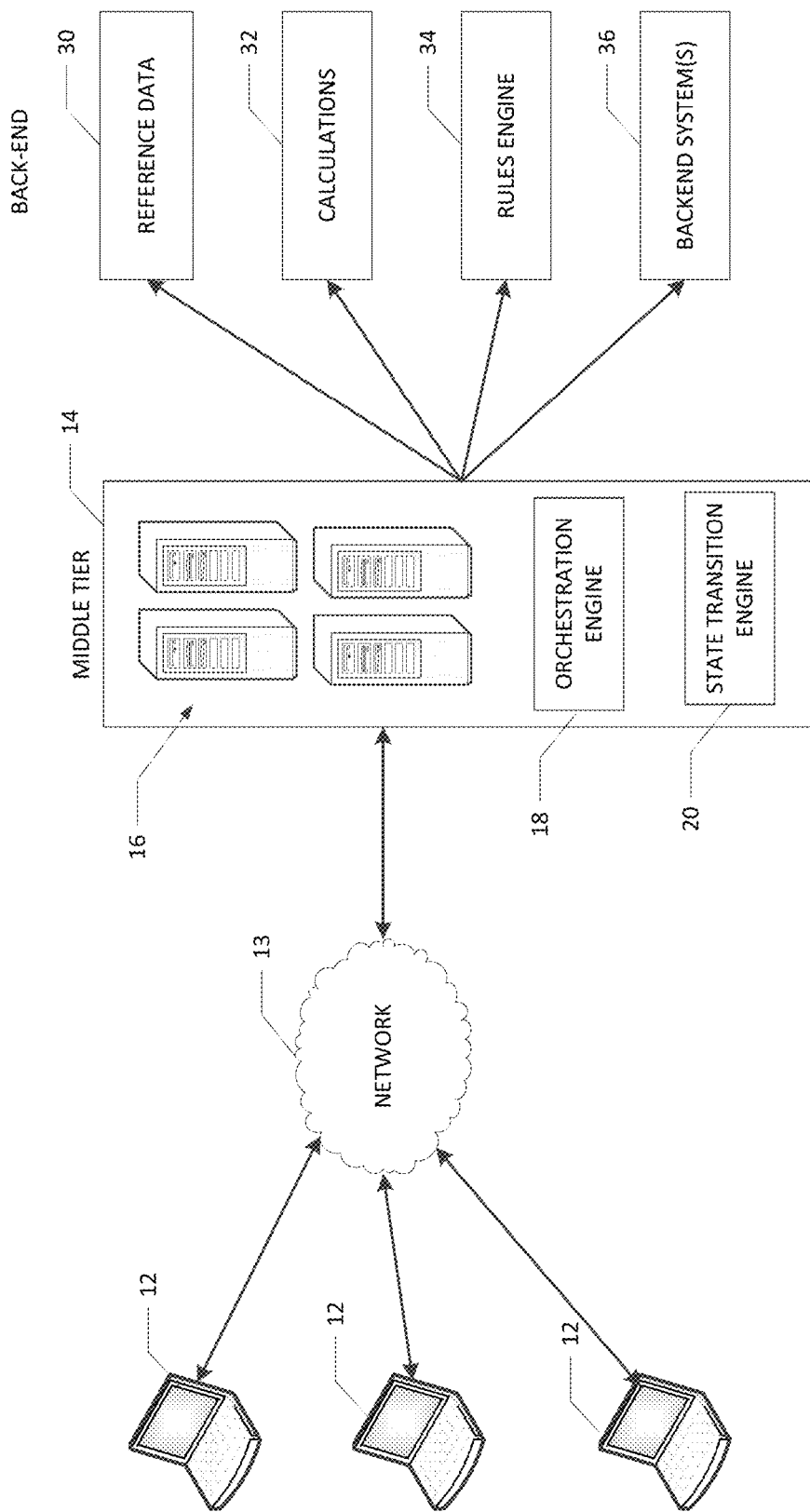
FIG. 1 is a diagram of an order management system.

FIG. 1 illustrates an order management system that handles trade orders for financial products according to various embodiments of the present invention. Users, at computer devices 12, submit trade orders for financial securities to a middle tier 14 via a data network 13 (which may be the Internet, a LAN, a WAN, etc.). The middle tier 14 may be implemented with servers 16, which may include and execute, for example, an orchestration engine 18 and a state transition engine 20. The orchestration engine 18 is a software program executed by the servers 16 that, when executed, orchestrates calls to back-end systems to obtain data and execute the necessary business logic to respond to the user requests. In such a context, the back-end systems may comprise reference data systems 30, calculation engines 32, rules engines 34 (which are the primary focus of the present invention) and other back-end systems 36 that are required to implement a trade order. The back-end systems 30-36 may be implemented with suitable computer systems, such as database management systems, servers, mainframes, etc.

The state transition engine 20 preferably is a Java-based rules engine that handles the transitions of trade orders from one state to the next in the progression of the trade order. In that connection, the state transition engine 18 is a software system, that when executed by the processors of the middle tier servers 16, executes state transition business rules for the order management system in a runtime production environment. It essentially handles the "order book" for the trades, recording the details of the order and its current status. As mentioned above, common states for trade orders include pre-approval (if approval is needed for some reason), open, filled, partially filled, canceled, confirmed, rejected, booked, etc. The applicable states for trade orders typically vary somewhat based on the type of security involved, such as stocks, mutual funds, bonds or fixed income securities, derivatives, foreign exchange, etc. The transitions from one state to another are governed by one or more conditions. For example, if the conditions for the transition from State A (e.g., open) to State B (e.g., filled) for a particular trade order are satisfied, the state transition engine 18 transitions the trade from State A to State B in the order book. Often, the middle tier servers 16 need to place back-end calls to determine whether the conditions for state transition are met. In such a context, the back-end systems may comprise reference data systems 30, calculation engines 32, rules engines 34 and other back-end systems 36. More details about the orchestration engine 18 and the state transition engine 20 may be found in U.S. patent application Ser. No. 16/272,362, entitled "Meta Data Driven State Transition Engine for Order Management System," and Ser. No. 62/724,918, entitled "Metadata Drive Orchestration Engine," respectively, which are hereby incorporated herein by reference in their entirety.

A rules engine 34 is a software system that executes business rules in a runtime production environment. The rules may implement legal regulations, company policies, or come from other sources. In the context of an order management system, for example, the rules engine 34 may apply rules to determine whether a trade order is acceptable; e.g., whether it should be placed or whether it should be rejected due to an applicable rule, and such business rules could draw from legal regulations, policies of the broker-dealer, or even client-specific rules, for example. The rules may also specify entity models and orchestration steps, the later of which may be utilized by the orchestration engine 18. As mentioned above, rules engines for order management systems are commonly performed in various code modules that are spread across multiple programs. As a result, it is often difficult, costly and time-consuming to update all of the programs when a new rule is promulgated (e.g., a rule to implement a new regulation or a new company policy).

Figure 2:
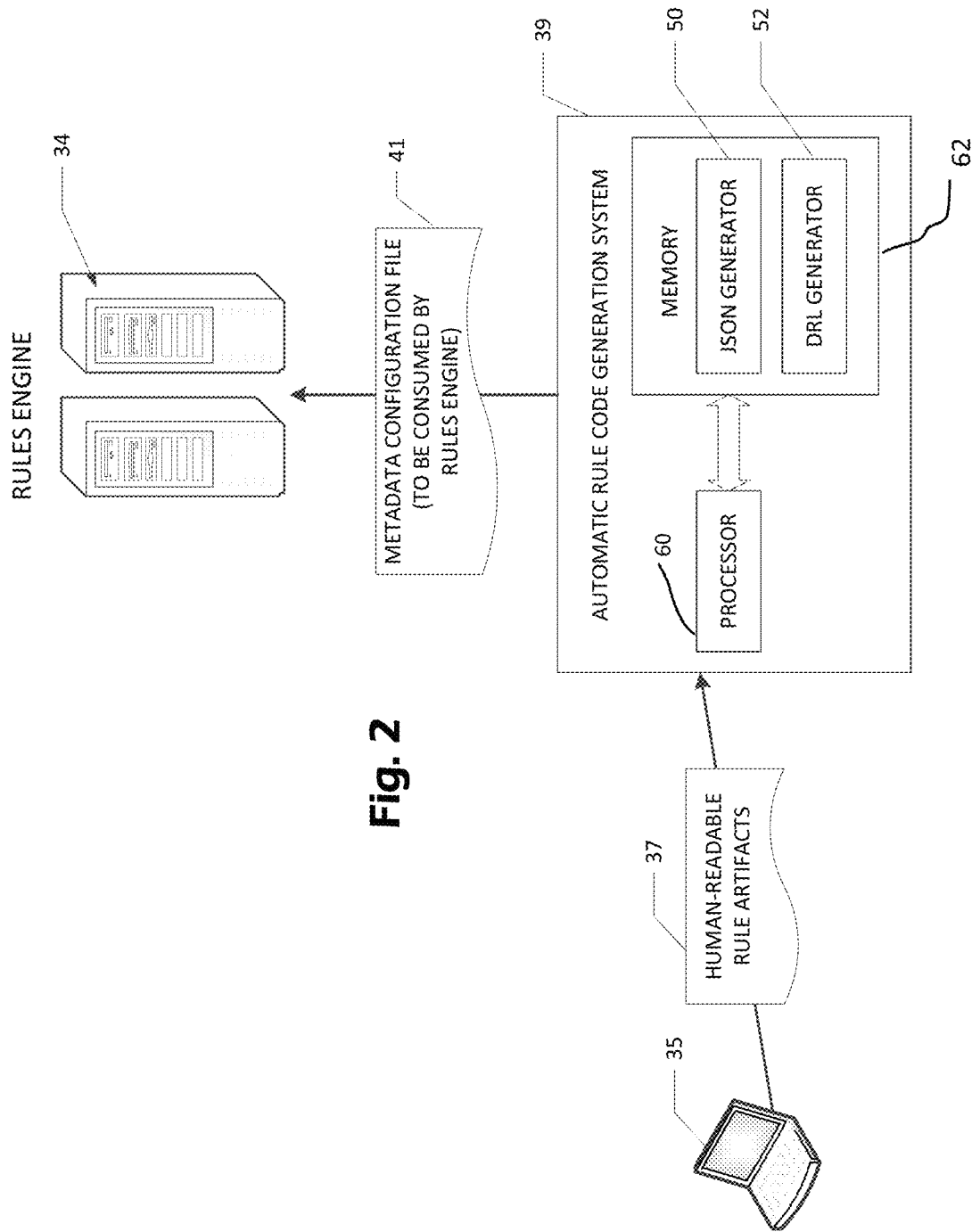
FIG. 2 is diagram of a system for generating rules code for a rules engine of the order management system according to various embodiments of the present invention.

To overcome this drawback in present order management systems, embodiments of the present invention utilize, with reference to FIG. 2, a computer-based, automatic rule code generation system 39 that converts a human-readable rule artifacts file 37 into a configuration file 41 for the rules engine 34 to run at compile time. According to various embodiments, a human operator(s) or programmer(s) as a computer device(s) 35 may specify, in the human-readable rule artifacts file 37, rule parameters, criteria and conditions for the rules engine 34. The artifacts file 37 is uploaded, transmitted or otherwise stored on the automatic rule code generation system 39. In various embodiments, the artifacts file 37 may comprise a spreadsheet file, although other human-readable file types could be used to specify the rules. In various embodiments, the artifacts file (e.g., spreadsheet) may include a rules data model sheet, a rules sheet, and an outcome sheet, among other sheets. The rules data model sheet, an example of which is shown below in FIG. 3, may define the data model for the rules. The rules sheet, an example of which is shown below in FIG. 4, may define the business rules. And the outcomes sheet, an example of which is shown in FIG. 5, may define the various outcomes and system message for the rules. The automatic rule code generation system 39 automatically generates the configuration file 41 from the artifacts file 37. In various embodiments, the configuration file 41 comprises rules that are written in Java code, particularly where the rules engine 34 uses dRools. dRools is a business rules management system (BRMS) with forward and backward chaining inference based rules engine. Such rules for dRools are often referred to as "DRLs." The rules engine 34 then executes the rule code in the configuration file 41 at runtime to implement the logic of the rules embodied in the artifacts file 37.

FIG. 3 shows an example rules data model that specifies various entity models. As shown in the example of FIG. 3, for an order management system, the entities may include, as shown in the column A, accounts, positions, securities, transactions, and any other entity types that are used or required for the particular order management system. Each entity type could have one or many "field names" that are listed separately in column B for the various entity types. The "type" column (column C) may specify the type of each field name, e.g., whether it is a string, a list of strings, a Boolean expression, a map, etc. or any other applicable type for the field name for the particular implementation. In some embodiments, collections and custom data types are supported in the rule expressions. For example, a "collection" data type could specify in the type column of the data model a collection of strings or a collection of Boolean expressions. Also, custom objects could be used as the data type. That way, rules could be defined using a collection of strings, a collection of Boolean expressions, a custom data type or a custom object.

Each entity-field name combination could also have a field type identified in column D and a data service to be called in column E if applicable. The data service can indicate which back-end data service can be called to obtain the data. Where applicable, the valid values for the entity-field name combination in a row can be specified in column E. Some entity-field name combinations may only have a limited number of valid values, such as yes, not, true, false, success, failure, etc. If there is not a limited number of valid values for an entity-field name combination, this column can be left blank. Finally, the rules data model may include a description for the entity-field name combinations. In that way, the data model for the various entities can be defined. FIG. 3 only shows a few entity types and suggests only a few field names for each listed entity type. In practice, the rules data model may include as many different entity types as needed and as many different field names for each entity type as needed.

The rules sheet, an example of which is shown in FIG. 4, specifies the rules to be implemented by the rules engine 34. The rules sheet may have any desired and appropriate number of columns, and preferably includes the following columns as shown in FIG. 4: a Rule ID column that specifies a unique rule ID for each rule; product applicability columns that specify which products (e.g., financial security types) that the rules apply to (e.g., a "Y" indicates that the rule applies to the indicated product type); a rule name column that specifies a unique rule name for the rule; a rule expression column that precisely specifies the rule; and a rule description column that textual summary or description of the rule. The rule expressions should be precise and can be expressed in simple Boolean logic expressions. For example, a rule expression could be that the value for a certain data field matches (or does not match) particular values set in brackets, such as "data.field is not {"x", "y", "z"}" or "value>999" or data.field is Empty, etc. Expressing rules in such a manner is far simpler and easier to understand than expressing the rules in programming languages like Scala, for example. Further, the automatic rule code generating system 39 can parse the expression to extract the rule logic when expressed in this form.

The outcomes sheet, an example of which is shown in FIG. 5, specifies the outcomes when a rule is triggered. The outcomes sheets may have any desired and appropriate number of columns, and preferably includes the following columns as shown in FIG. 5: a rule ID and rule name columns whose entries are linked to and/or match the rule ID and rule name columns, respectively, in the rules sheet (see FIG. 4); an outcome column that specifies the outcome of the rule when it is triggered; and a rule message column that specifies a system message that is displayable to a user of the system (e.g., a user 12 that input a trade order that is not accepted due to application of one of the rules) explaining why the rule applies. As shown in FIG. 5, possible entries in the outcome column are failure (e.g., the trade order was rejected due to the rule), warning (e.g., the trade order was accepted by a warning was triggered), and manager approval (e.g., a manager has to decide whether to approve the trade order).

In various embodiments, the automatic rule code generation system 39 receives the human-readable artifacts file 37 with the business rules from the programmer(s) at the computer device(s) 35 shown in FIG. 2 via a data network, for example. The artifacts file 37 defines the rules, including their outcomes, for the order management system, as described above. The automatic rule code generation system 39 then programmatically captures the logic of the rules and the rule metadata and, based thereon, generates the configuration file 41 to be executed by the rules engine 34 at runtime. In various embodiments, as shown in FIG. 2, the automatic rule code generation system 39 may include a JSON (JavaScript Object Notation) generator component 50, which generates, for example, JSON metadata for the rules from the artifacts file 37. The JSON generator component 50 preferably applies validations, row by row, for the rules sheet of the artifacts file 37, to generate the JSON metadata for the rules that embeds the logic of the rules.

The automatic rule code generation system 39 may also comprise a DRL generator component 52 as shown in FIG. 2. In a preferred embodiment, the DRL generator component 52 generates the rule code (e.g., DRLs) for the configuration file 41 in the dRools language based on the JSON metadata generated from the artifacts file 37 by the JSON generator 50. The DRL generator component 52 may, for example, read the rules from the JSON metadata, validate and substitute the values in defined DRL templates. The DRLs in the configuration file 41 are stored in a memory of the rules engine 34 and executed at runtime. In that way, the rules engine 34 executes the rules specified in the human-readable artifacts file.

In various embodiments, the order management system is capable of receiving and handling multi-orders, e.g., a trade order with sub-trade orders for multiple different financial securities (e.g., a basket order), with the sub-trade orders in the multi-order to be executed simultaneously (or near simultaneously). In such circumstances, the rules engine 34 preferably both: (1) applies rules applicable to the individual sub-trade orders making up the multi-order independently to accept/reject the individual sub-trade orders in the multi-order; and (2) applies cross-order rules that apply across all of the sub-trade orders in a multi-order in aggregate. The cross-order rules may, for example, be based on aggregate values across all of the individual sub-trade orders in the multi-order to determine whether the multi-order trade order should be accepted or rejected. For example, if the multi-order is an order to buy multiple different stocks, a multi-order can check the aggregate cost to purchase all of the stocks and, for example, reject the order if the aggregate cost exceeds a threshold, even though the sub-orders in the multi-order might be individually acceptable. To program the rules engine 34 to apply multi-order rules, multi-order business rules can be included in the artifacts file 37, in human-readable form as before, so that the multi-order rules are included in the configuration file 41 generated by the automatic rule code generation system 39 and executed by the rules engine 34. A rule expression in the configuration file 41 may include, for example, "group by" commands to group multiple individual trade orders in a cross-order rule. Similar to rules for trade orders for individual financial products, the automatic rule code generation system 39 can parse the multi-order rules in the artifacts file 37 to generate the JSON metadata for the multi-order rules, and then generate the DRLs based on the JSON metadata. The multi-order DRLs can then be included in the configuration file 41 to be executed by the rules engine 34.

Figure 6:
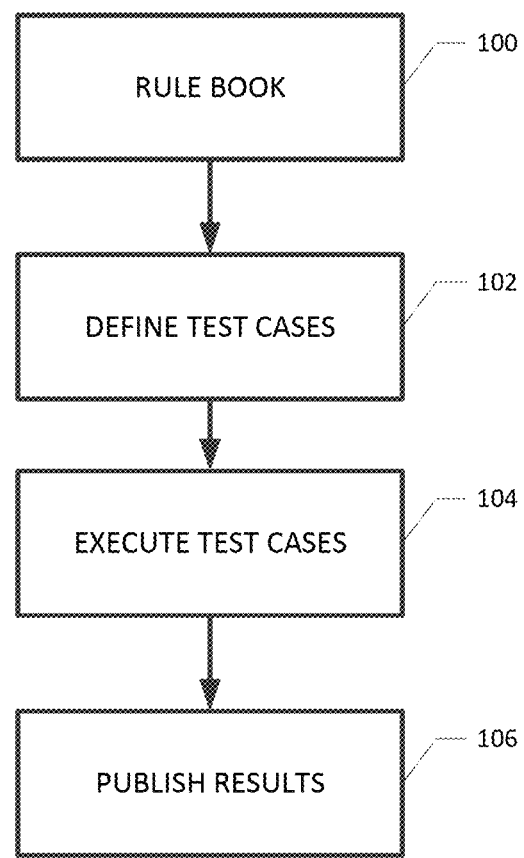
FIG. 6 is a flowchart of a method for executing test cases of the rules engine according to various embodiments of the present invention.

In various embodiments, the present invention can also provide the ability to automatically execute test cases to verify the business rules. FIG. 6 is a diagram of a process for executing test cases according to various embodiments of the present invention. The process starts at step 100, when a user/person reviews the latest rule book to be tested. Then, at step 102, the user/person can define test cases. Here, the test cases can be trade orders that should be flagged or triggered by a rule in the rule book. At step 104, the test case trade orders are sent to the order management system to determine whether the applicable rule(s) were triggered by the test cases. As explained above, the rules are implemented by the rules engine 34 running the configuration file 41 that is generated from the artifacts file 37 that define the rules. Then, at step 106, the outcomes for the test cases can be published so that the results can be compared to the expected outcomes for the tests cases.

In some embodiments, one or more rules in the business rules in the human-readable file 37 may be so-called "computation" rules. With computation rules, instead of the outcome of the rule being a binary value (0 or 1, or T or F), the outcome of the rule is a computed value. For example, referring to FIG. 4, the rule expression field for a computation rule may specify a computation to be performed by the rules engine 34 and, referring to Figure, the outcome field for the computation rule may specify that the outcome is a value (or a value restricted to a certain range). As such, the computation rules, the rules engine 34 runs logic to make a computation pertinent to the trade order and returns that computed value to the middle tier 14.

In still other embodiments, the rules engine 34 could support a common rule book in addition to the rules in the artifacts file 37. Such a common rule book could contain, for example, rules that are applicable across multiple products (e.g., rules for trade orders for stocks, bonds, derivatives, foreign exchange, etc.). To support a common rule book, the processor 60 of the automatic rule code generation system 39 (see FIG. 2) may execute an instruction to use a specified common rule book. As such, the automatic rule code generation system 39 may generate the rule code at compile time for the business rules in the common rule book.

In addition, the automatic rule code generation system 39 in various embodiments may combine multiple independent rule books in a single instance. For example, at compile time, the automatic rule code generation system 39 may generate rule code from multiple independent artifacts files 37 to be run independently by the rules engine 34 at run time of the rules engine 34.

Such mechanisms for generating rule code for the rules engine 34 provide many potential and realizable benefits for order management systems. Primarily, the inventions can help separate the metadata for business rules, underlying entity model and orchestration steps from the rules engine itself. Further, the metadata is automatically generated from human readable artifacts. These aspects can solve many issues: it externalizes business riles from code in a language that is easy to understand; the business rules framework is agnostic of the rules engine used to execute the rules; live documentation of the business rules that never goes out of sync; automated testing of rules as descried below; and reduced cost of maintenance and testing. In particular, because the business rules are generated from the human readable artifacts file 37, the rules engine 34 can be asset class-agnostic. That is, the rules for trades in one asset class (e.g., stocks) are typically different from the rules for trades in another asset class (e.g., bonds or derivatives, etc.). One prior art way to handle this is to have a separate rules engine for each asset class. However, embodiments of the present invention provide the ability to specify business rules for an asset class-agnostic to the order management system, since the "programmer" 35 can specify the business rules in the artifacts file 37 for the different asset classes and the rules engine 34 then execute the rules in the configuration file 41 generated from the file 37 to implement the rules for the various trade orders it receives, across the various asset classes. Embodiments of the present invention also provide the ability to specify the rules in metadata configuration files 41 separate from the rules engine 34.

FIG. 2 is a diagram of the automatic rule code generation system 39 according to various embodiments. As shown in FIG. 2, the rule code generation system 39 may comprise one or more processors 60 and one or more data storage or computer memory units 62. For simplicity, only one processor 60 and one memory unit 62 is shown in FIG. 2. The memory 62, which may comprise primary (memory directly accessible by the processor, such as RAM, processor registers and/or processor cache) and/or secondary (memory not directly accessible by the processor, such as ROM, flash, HDD, etc.) data storage, stores computer instruction or software to be executed by the processor 60. In particular, as shown in FIG. 2, the memory 62 may store the JSON generator software 50 and the DRL generator software 52. When the processor 60 executes the JSON generator software 50, the processor 60 may generate the JSON metadata from the artifacts file 37 as described above. When the processor 60 executes the DRL generator software 52, the processor 60 generates the DRLs from the JSON metadata as described above. The automatic rule code generation system 39 could be implemented with a middle tier server in various embodiments, or it could be implemented with a computer system (e.g., server, PC, mainframe, etc.) that is remote from the order management system middle tier and in communication with the middle tier via a data network (e.g., a LAN, WAN, Ethernet, Internet, etc.). The processor(s) 60 may include single or multicore CPUs, for example. The processors(s) 60 may also comprise heterogeneous multicore processor(s) that include, for example, CPU, GPU and/or DSP cores. The code for the JSON generator software 50 and/or the DRL generator software 52 may be written in the Python of Java programming language, for example, although other suitable programming languages could be used.

The software for the various compute systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to an order management system that comprises a rules engine and a computer-based automatic rule code generation system. The computer-based automatic rule code generation system is configured, through programming, to: (1) receive a human-readable file that specifies one or more rules and a corresponding outcome for each of the one or more rules; and (2) generate, at compile time, a configuration file that comprises rule code from the file, wherein the rules engine runs the rule code in the configuration file at runtime to apply the one or more rules for trade orders processed by the order management system.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, although aspects of the present invention are described herein in the context of an order management system, other embodiments are not so limited and could be applied to other types of systems where it would be beneficial to generate metadata-driven business rule code from human readable artifact files. Also, although the embodiments described above primarily employed a spreadsheet for the artifacts file 37, other types of file types in which the rules could be expressed in human-readable form may be used, such as word processing documents, etc.

Still further, although embodiments above were described in the context of an order management system using dRools with JSON metadata, the present invention is not so limited unless otherwise indicated, and can therefore be applied to other types of rules that use other types of rules engines.

Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An order management system that executes trade orders for financial products, the order management system comprising:
   one or more back-end computer systems, wherein the one or more back-end computer systems comprises a back-end rules engine;
   a middle tier that comprises one or more servers, wherein the one or more servers of the middle tier are configured to execute trade orders received by the middle tier, wherein the one or more servers of the middle tier are configured to execute the trade orders by being configured to make calls to the one or more back-end computer systems, including calls to the back-end rules engine; and
   a computer-based automatic rule code generation system that is configured, through programming, to:
      receive a human-readable spreadsheet data file that comprises a rule book for the back-end rules engine, wherein the rule book specifies business rules governing trade orders managed by the order management system, wherein the business rules specified in the human-readable spreadsheet data file are to be implemented by the back-end rules engine in response to the calls from the middle tier, wherein the human-readable spreadsheet data file comprises;
         a rules data model sheet that defines data models for each of the business rules in the human-readable spreadsheet data file;
         a rules sheet that defines each of the business rules in the human-readable spreadsheet data file; and
         an outcome sheet that defines an outcome for each of the business rules when the business rule is violated; and
      generate, at compile time, from the human-readable spreadsheet data file, a configuration file that comprises rule code for the back-end rules engine in a language executable by the back-end rules engine, wherein the automatic rule code generation system is configured, through programming, to generate the configuration file with the rule code by:
         generating metadata from the human-readable spreadsheet data file; and
         generating the rule code from the metadata, and
   wherein the back-end rules engine is configured to run the rule code in the configuration file at runtime to apply the business rules to the trade orders in response to calls from the middle tier.

2. The order management system of claim 1, wherein the middle tier comprises:
   an orchestration engine that orchestrates calls by the middle tier to the one or more back-end computer systems; and
   a state transition engine that manages state transitions for the trade orders.

3. The order management system of claim 1, wherein the business rules comprise rules for evaluating whether a trade order is unacceptable, wherein the trade order is unacceptable when the trade order violates one of the business rules.

4. The order management system of claim 3, wherein the business rules comprise a first set of business rules such that, when a trade order violates a rule in the first set of business rules, the trade order is rejected by the order management system.

5. The order management system of claim 4, wherein the business rules comprise a second set of business rules such that, when a trade order violates a rule in the second set of business rules, the order management system provides a warning to a party that submitted the trade order to the order management system.

6. The order management system of claim 5, wherein the business rules comprise a third set of business rules such that, when a trade order violates a rule in the third set of business rules, manager approval of the trade order is required before the order management system executes the trade order.

7. The order management system of claim 1, wherein:
   the generated metadata comprises JavaScript Object Notation ("JSON") metadata;
   the rule code is generated from the JSON metadata by substituting values in the JSON metadata into a defined DRL template; and
   the back-end rules engine comprises a Java-based rules engine.

8. The order management system of claim 1, wherein the business rules comprise a computation rule, wherein the outcome for the computation rule is a value computed by the back-end rules-engine.

9. The order management system of claim 1, wherein:
   the automatic rule code generation system is configured, through programming, to generate the rule code by:
      generating JSON metadata from the human-readable spreadsheet data file; and
      generating the rule code from the JSON metadata; and
   the back-end rules engine comprises a Java-based rules engine.

10. The order management system of claim 1, wherein:
    the business rules in the configuration file comprise a cross-order business rule for a multi-order trade order; and
    the back-end rules engine evaluates a trade order for compliance with the cross-order business rule based on an aggregate of sub-trade orders in the multi-order trade order.

11. The order management system of claim 1, wherein:
    the human-readable spreadsheet data file is for a first rule book; and
    the computer-based automatic rule code generation system is further configured, through programming, to:
       receive a second human-readable file that specifies business rules for a second rule book that is independent from the first rule book; and
       generate, at compile time, from the second human-readable file, a second configuration file that comprises rule code for the second rule book; and
    the back-end rules engine is configured to run the rule code from the first and second rule books at runtime to apply the business rules in the first and second rule books to the trade orders in response to calls from the middle tier.

12. A method of configuring a computer-implemented order management system that executes trade orders for financial products, wherein the order management system comprises:
- one or more back-end computer systems, wherein the one or more back-end computer systems comprises a back-end rules engine; and
- a middle tier that comprises one or more servers, wherein the one or more servers of the middle tier are configured to execute trade orders received by the middle tier, wherein the one or more servers of the middle tier are configured to execute the trade orders by being configured to make calls to the one or more back-end computer systems, including calls to the back-end rules engine, the method comprising:
- receiving, by a computer-based automatic rule code generation system, a human-readable spreadsheet data file that comprises a rule book for the back-end rules engine, wherein the rule book specifies business rules governing trade order managed by the order management system, wherein the business rules specified in the human-readable file are to be implemented by the back-end rules engine in response to the calls from the middle tier, wherein the human-readable spreadsheet data file comprises:
  - a rules data model sheet that defines data models for each of the business rules in the spreadsheet data human-readable file;
  - a rules sheet that defines each of the business rules in the human-readable spreadsheet data file; and
  - an outcome sheet that defines an outcome for each of the business rules when the business rule is violated;
- generating, by the computer-based automatic rule code generation system, at compile time, a configuration file that comprises rule code for the back-end rules engine from the human-readable spreadsheet data file, wherein the generated rule code is in a language executable by the back-end rules engine, and wherein generating the configuration file comprises:
  - generating, by the automatic rule code generation system, metadata from the spreadsheet data human-readable file; and
  - generating, by the automatic rule code generation system, the rule code from the metadata; and
- executing, at runtime, by the back-end rules engine, the rule code in the configuration file in response to calls from the middle tier to apply the business rules in the configuration file.

13. The method of claim 12, wherein the middle tier comprises:
- an orchestration engine that orchestrates calls by the middle tier to the one or more back-end computer systems; and
- a state transition engine that manages state transitions for the trade orders.

14. The method of claim 12, wherein:
- the generated metadata comprises JSON metadata;
- the rule code is generated from the JSON metadata by substituting values in the JSON metadata into a defined DRL template; and
- the back-end rules engine comprises a Java-based rules engine.

15. The order management system of claim 12, wherein:
generating the rule code comprises:
- generating, by the automatic rule code generation system, JSON metadata from the human-readable spreadsheet data file; and
- generating, by the automatic rule code generation system, the rule code from the JSON metadata; and
the back-end rules engine comprises a Java-based rules engine.

16. The method of claim 12, wherein:
- the business rules in the file comprise a cross-order business rule for a multi-order trade order; and
- the method further comprises evaluating, by the back-end rules engine, a trade order for compliance with the cross-order business rule based on an aggregate of sub-trade orders in the multi-order trade order.

* * * * *